July 29, 1941. T. C. DELAVAL-CROW 2,251,012

BEARING SEAL

Filed March 8, 1939

INVENTOR;
THOMAS C. DELAVAL-CROW,
BY
HIS ATTORNEY.

Patented July 29, 1941

2,251,012

UNITED STATES PATENT OFFICE 2,251,012

BEARING SEAL

Thomas C. Delaval-Crow, Bristol, Conn., assignor to General Motors Corporation, Detroit, Mich., a corporation of Delaware Application March 8, 1939, Serial No. 260,568

6 Claims. (Cl. 286—11)

This invention relates to bearings and more particularly to a bearing seal that keeps a lubricant within a bearing and which prevents water and other deleterious substances from entering into the bearing.

An object is to provide an improved seal of extreme simplicity that need not be constructed within close limits of accuracy, and another object is to provide such a seal in unit-handling relation with a pair of relatively rotatable members as the race rings of an antifriction bearing. A further object is to provide an improved seal for maintaining lubricant within a bearing and which will throw water and other deleterious substances away from the zone of sealing contact during a bearing rotation, and which will maintain a highly effective sealing relation even when the seal supporting members run out of their normally coaxial relation.

To these ends, and also to improve generally upon devices of the character indicated, my invention consists in the various matters hereinafter described and claimed.

Figures 1, 2:
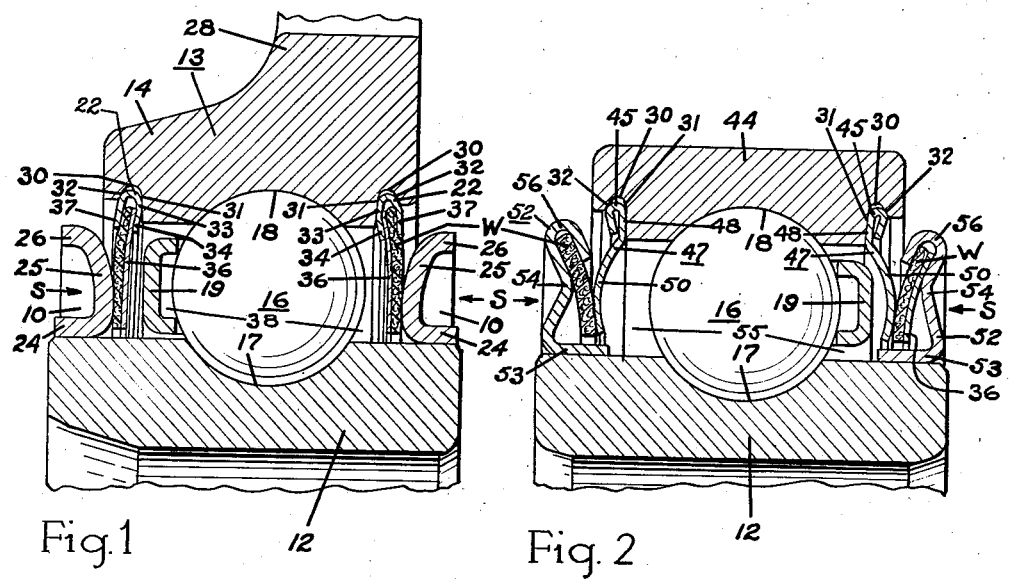
Figure 1 is a fragmentary view in axial section and showing a ball bearing equipped with one embodiment of my invention.
Figure 2 is a fragmentary axial section showing another form of my seal in unit-handling relation with a ball bearing.

Generally stated, each of my sealing devices, S, includes an annular slinger member, as 10, sealingly secured to a rotatable member as an inner race ring 12 of an antifriction bearing, such as the unit-handling ball bearing 13, provided with a non-rotatable member, as the outer race ring 14, and the bearing balls 16 are guided in the raceways 17 and 18 by the cage 19. An annular member, as 22, is sealingly secured within the outer race ring in laterally spaced relation from the slinger member, and a flexible sealing washer W, which tends to assume a planar form, is peripherally supported by one of these members and laterally deformed into resiliently yieldable sealing engagement with the other member. The slinger member, as 10, which preferably extends beyond the end of the outer race ring, serves to throw water and other deleterious substances away from the zone of sealing contact, and the yieldable sealing washer W is laterally urged into sufficiently tight wiping sealing contact with its seal engaging member so that the parts need not be precisely located or constructed within very close limits of accuracy, and a sealed relation is always maintained even in the event that the race rings, as 12 and 14, should become located out of their normal coaxial relation.

Referring now particularly to the drawing, in the embodiment of Figure 1 the slingers 10, which are preferably made from sheet metal rings bent to shape, are each provided with a mounting flange 24 pressed in tight sealing engagement over the ends of the inner race ring 12 that extend beyond the ends of the outer race ring 14, and the annular side walls 25 of these slingers, against which the washers W wipe in sealing contact, are smoothly and laterally curved outwardly from the bearing and terminate in a reinforcing rim 26 located beyond the outer race ring 14, so that water and other deleterious substances will be thrown away from the sealing zone by the centrifugal forces set up by the inner race ring rotation.

The outer race ring 14, which may be provided with a flange 28 for securing the bearing to a suitable support, is provided near its ends with the internal grooves 30, each groove having an inner side wall 31, forming part of a deep shoulder, and a divergent outer wall 32. The annular member 22, which is generally U shaped in cross section and preferably composed of sheet metal bent to shape, has a rear wall 33 adapted to fit against the shoulder 31, and the inner portion of this wall 33 is substantially conical and directed outwardly at 34. The sealing washer W and preferably a flat spring backing disc 36 are peripherally located in the member 22 which is initially of such a size that it may be laterally inserted in the groove 30, after which the front wall 37 of the member 22 is bent inwardly to sealingly clamp the washer W and the disc 36 in the member 22. This bending of the member 22 into clamped position also serves to locate it in non-bottoming but tightly wedged sealing engagement with the side groove walls 31 and 32 as disclosed in the United States patent to Murden Number 2,140,091 and issued on December 13, 1938. The rear wall 33 will fit against the shoulder 31 and angularly locate the wall portion 34 of the member 22 which conically and laterally deforms the spring backed washer W into the desired yieldable engagement with the slinger 10 so that the washer W and the wall 25 will sealingly engage in oppositely convexed lateral wiping relation. If desired, the backing disc 36 may be dispensed with and the member 22 may be depended upon to laterally deflect the washer W into the required sealing contact.

The lubricant chamber 38 between the race rings is charged with a suitable lubricant supply during the assembly of the seals S in the bearing, and this lubricant will be sufficient for the entire life of the bearing since these seals effectively prevent lubricant leakage. The movement of the bearing balls 16 during the bearing rotation will tend to force the lubricant against the back of the spring discs 36 and the washers W to urge the washers W into even tighter sealing contact.

Figure 2 shows a modified construction of my seal S in unit-handling relation with a unit-handling ball bearing generally similar to the bearing 13 of Figure 1, and having the outer race ring 44, the inner race ring 12 and the balls 16 guided by the cage 19. The race ring 44 is internally grooved at 30 near its ends, and the curled-over peripheral edge 45 of each shield member 47 is securely wedged in non-bottoming sealing engagement between the divergent side walls 31 and 32 of its groove 30 with the annular shield face 48 fitted against the shoulder 31 so that the shields 47 are sealingly mounted in the race ring 44 in the same general manner as disclosed in the United States patent to Murden, number 2,140,091 and issued on December 13, 1938. The shields 47 are preferably dished outwardly between the race rings to form the annular convex seal engaging faces 50 that are generally torroidal in contour.

Each slinger 52, which is preferably shaped from a sheet metal ring, has a mounting flange 53 sealingly pressed over the extended end of the race ring 12, and an outwardly directed slinger wall 54 has a rim 56 folded back into peripherally clamped sealing engagement with the washer W. This wall 54 is bent to conically direct the rim 56 inwardly so that the washer W will be substantially conically deformed into yieldable side wiping sealing contact with the convex shield face 50. If desired, as shown at the right-hand end of the bearing, a flat spring disc 36 may also be clamped within the rim 56 in backing relation to the washer W to aid in resiliently pressing this washer into its sealing position. Lubricant from the chamber 55, which is permanently sealed in the bearing by the seals S at each end thereof, will be pressure urged by the rolling movement of the balls 16 in back of the washers W to further press these washers into sealing engagement.

Figure 3:
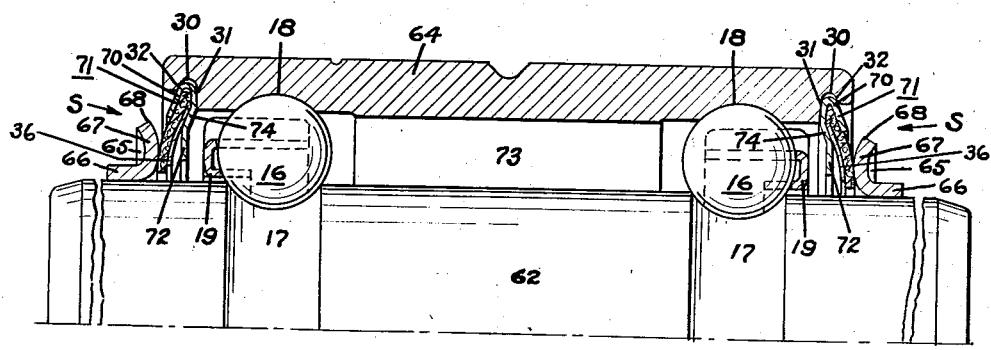
Figures 3 and 4 are fragmentary sectional views showing other embodiments of my seals mounted in unit-handling relation with antifriction bearings.

Figure 3 shows another embodiment of my seal S, which is somewhat similar to the form of Figure 1, and applied to a double row unit-handling ball bearing wherein the inner race ring is shown as a shaft 62 that extends through and beyond the ends of the outer race ring 64 which has the spaced ball grooves 18 that receive the balls 16, guided by the cages 19 and engaged within the ball grooves 17 formed in the shaft 62. The slingers 65 have mounting flanges 66 sealingly pressed over the shaft 62, and the annular slinger walls 67 are outwardly convexed to their peripheral edges 68 which lie beyond the ends of the outer race ring 64. The ends of the outer race ring 64 are respectively provided with the internally disposed peripheral grooves 30 that have the divergent side walls 31 and 32 between which the rolled over edges 70 of the shield members 71 are tightly wedged in non-bottoming sealing engagement and sealingly clamped over the peripheral edges of the backing discs 36 and the washers W in the same general manner that the member 22 and the similar parts are mounted in the embodiment of Figure 1.

Each shield 71 has an annular wall 72 that extends across the major portion of the space between the race rings 62 and 64 to aid in maintaining a lubricant within the lubricant chamber 73, and an intermediate substantially conical portion 74 of this wall 72 laterally and conically deforms the disc backed washer W into a sealing wiping contact with the rounded slinger wall 67. The rolling of the balls 16 in their raceways tends to press the lubricant against the backs of the disc 36 and the washers W to aid the sealing engagement of the washers W.

Figure 4:
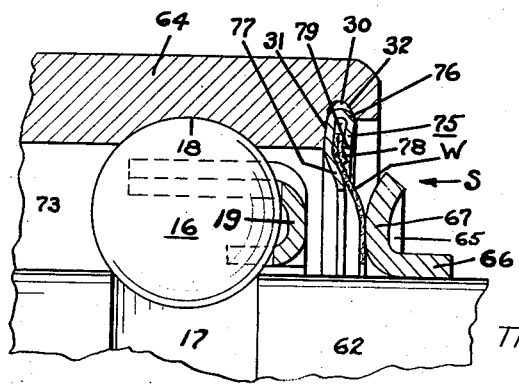

Figure 4 shows a bearing and seal structure generally similar to that illustrated in Figure 3 except that the shield 71 of Figure 3 is replaced by a sheet metal ring 75 provided with a folded-over rim 76 wedged in non-bottoming relation in the groove 30 and sealingly clamped against the periphery of a relatively thin washer W which is laterally and substantially conically deformed by the conical rounded ring portion 77 into yieldable sealingly wiping contact with the rounded slinger wall 67 of the slinger 65. This washer, which may be composed of a suitable fibrous or molded material, is freely flexible and yet has sufficient inherent stiffness and resiliency so that it will tend to return to its original planar form. A transversely bent ring 78 is preferably clamped between the washer W and the outer curled edge 79 of the rim 76 to prevent this edge from cutting the washer W.

Although each of the constructions illustrated is particularly adapted to have the inner race ring serve as the rotatable bearing member, it will be appreciated that the inner race ring may be held stationary and the outer race ring may serve as the rotatable bearing member in which event the shield member or washer W mounted in the groove 30 will act as a slinger and an effective seal will be maintained at all times.

I claim:

1. In a device of the character indicated, a pair of relatively rotatable inner and outer members having an annular lubricant chamber therebetween, a pair of annular sealing elements carried by said members and co-operatively closing one end of said lubricant chamber, one of the elements having an annular slinger portion outside of the lubricant chamber and axially projecting away from said outer member, one of said elements being flexible and tending to assume a planar form, a holder mounted on one of the members and clamped over an edge of the flexible sealing element, and conical means on the holder for laterally deforming said flexible element from its initially flat condition towards and into side-wiping sealing contact with the other sealing element.

2. In a device of the character indicated, a pair of relatively rotatable members having an annular lubricant chamber therebetween, a pair of annular sealing elements respectively carried by said members and co-operatively closing one end of said lubricant chamber, an annular slinger portion on one of the elements and axially projecting outside of and beyond the end of said outer member, one of said elements being flexible, a holder mounted on one of said members and clamped over the outer peripheral edge of said flexible member, and a conical annular portion on the holder which laterally and axially deforms the flexible element towards and into sealing engagement with the other element.

3. In a device of the character indicated, a pair of relatively rotatable inner and outer members having an annular lubricant chamber therebetween, a pair of annular sealing elements carried by said members and co-operatively closing one end of said lubricant chamber, one of said elements being provided with an annular slinger portion which lies outside of the lubricant chamber and which axially projects beyond said outer member, one of said elements being flexible, an annular holder secured to one of the members and clamped over the outer edge of the flexible member, a conical wall on the holder which axially deflects said flexible element from an initial planar form towards and into yieldable side-wiping contact with the other element adjacent to said inner member, and means carried by the holder for resiliently urging the flexible element into sealing position.

4. In a device of the character indicated, a non-rotatable outer member and a rotatable inner member, said members being annularly spaced apart by a lubricant chamber, an annular holder mounted in the outer member at one end of the lubricant chamber and extending towards said inner member, an annular flexible sealing element peripherally clamped in said holder and extending towards said inner member, an annular inner sealing element mounted on the inner member, a convexed seal-engaging face on the inner element and which forms a slinger at its outer edge that is outside of the lubricant chamber, and a conical wall on the holder which laterally deflects the flexible sealing element from an initially planar form into side-wiping sealing contact with said convexed surface adjacent to the inner rotatable member.

5. In a device of the character indicated, a pair of relatively rotatable inner and outer members having an annular lubricant chamber therebetween, the inner member extending out of and beyond the end of said outer member, a pair of sealing elements carried by said members and closing one end of the lubricant chamber, one of said elements having a convexed slinger portion outside of the lubricant chamber and extending axially away from and beyond the end of said outer member, one of said elements being flexible and tending to assume a planar form, a holder on one of the members and clamped over the outer edge of the flexible member, an annular tapering wall on the holder angularly and substantially conically deforming the flexible element towards and into side-wiping sealing contact with said other element, and a backing disc deformed by said holder to resiliently urge the flexible element into sealing position.

6. In a device of the character indicated, a pair of relatively rotatable inner and outer members having an annular lubricant chamber therebetween, a shield secured to the outer member and extending towards the inner member at one end of said chamber, a holder mounted on the inner member adjacent to said shield, a flexible annular sealing element, and conical means on the holder that clamps over the outer edge of the flexible sealing element outside of said lubricant chamber and which laterally deforms said sealing element into side-wiping sealing engagement with said shield adjacent to said inner member.

THOMAS C. DELAVAL-CROW.